United States Patent
Jung et al.

(10) Patent No.: US 11,069,910 B2
(45) Date of Patent: Jul. 20, 2021

(54) METHOD FOR CONTROLLING HYDROGEN CUT-OFF VALVE MOUNTED ON FUEL CELL VEHICLE

(71) Applicants: HYUNDAI MOTOR COMPANY, Seoul (KR); KIA MOTORS CORPORATION, Seoul (KR)

(72) Inventors: Se Kwon Jung, Seoul (KR); Hyeon Seok Ban, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 239 days.

(21) Appl. No.: 15/809,596

(22) Filed: Nov. 10, 2017

(65) Prior Publication Data
US 2018/0175417 A1 Jun. 21, 2018

(30) Foreign Application Priority Data

Dec. 15, 2016 (KR) .................. 10-2016-0171372

(51) Int. Cl.
| | |
|---|---|
| *H01M 8/04664* | (2016.01) |
| *H01M 8/04089* | (2016.01) |
| *H01M 8/04082* | (2016.01) |
| *H01M 8/0438* | (2016.01) |
| *H01M 8/04746* | (2016.01) |

(52) U.S. Cl.
CPC ... *H01M 8/04664* (2013.01); *H01M 8/04089* (2013.01); *H01M 8/04201* (2013.01); *H01M 8/04388* (2013.01); *H01M 8/04686* (2013.01); *H01M 8/04753* (2013.01); *H01M 2250/20* (2013.01); *Y02E 60/32* (2013.01)

(58) Field of Classification Search
CPC ......... H01M 8/04664; H01M 8/04671; H01M 8/04201; H01M 8/04388; H01M 8/04753; H01M 8/04089
See application file for complete search history.

(56) References Cited

U.S. PATENT DOCUMENTS 6,712,088 B2 * 3/2004 Gamou ................. F16K 15/026
137/341
6,805,328 B2    10/2004 Filkovski et al.
(Continued)

FOREIGN PATENT DOCUMENTS

| JP | 2011165318 | * | 8/2011 |
|---|---|---|---|
| JP | 2011165318 A | * | 8/2011 |

(Continued)

*Primary Examiner* — Ula C Ruddock
*Assistant Examiner* — Thomas H. Parsons
(74) *Attorney, Agent, or Firm* — Morgan, Lewis & Bockius LLP

(57) ABSTRACT

A method is provided for controlling a hydrogen cut-off valve, which may be provided on a hydrogen supply line of a fuel cell system, in driving a fuel cell vehicle mounted with a hydrogen supply line including a high-pressure tank storing hydrogen, a hydrogen supply valve, and a hydrogen cut-off valve. The method includes: a step (a) of measuring a duty applying to the hydrogen supply valve and a step (b) of comparing the duty with a predetermined duty, in which when the duty is equal to or more than the predetermined duty, it is determined that the hydrogen supply line between the high-pressure tank and the hydrogen supply valve is abnormal.

8 Claims, 4 Drawing Sheets

(56) References Cited

U.S. PATENT DOCUMENTS

| | | | | |
|---|---|---|---|---|
| 7,904,257 B2 * | 3/2011 | Nakada | ................. | G01F 1/34 |
| | | | | 702/47 |
| 2016/0079618 A1 * | 3/2016 | Fukunaga | ......... | H01M 8/04089 |
| | | | | 429/429 |

FOREIGN PATENT DOCUMENTS

| KR | 10-2004-0003575 A | | 1/2004 |
|---|---|---|---|
| KR | 20140083823 A | * | 7/2014 |
| KR | 10-2015-0055681 A | | 5/2015 |
| KR | 10-1558682 B1 | | 10/2015 |

* cited by examiner

METHOD FOR CONTROLLING HYDROGEN CUT-OFF VALVE MOUNTED ON FUEL CELL VEHICLE

CROSS-REFERENCE TO RELATED APPLICATION

This application claims under 35 U.S.C. § 119(a) the benefit of priority to Korean Patent Application No. 10-2016-0171372 filed on Dec. 15, 2016, the entire contents of which are incorporated herein by reference.

BACKGROUND

(a) Technical Field

The present disclosure relates to a method for controlling a hydrogen cut-off valve, which can determine whether a hydrogen supply line is abnormal by a duty of a hydrogen supply valve and a line pressure of the hydrogen supply line through which fuel, more specifically, hydrogen is supplied in a fuel cell vehicle equipped with a fuel cell system. Particularly, the present disclosure relates to a method for controlling a hydrogen cut-off valve, which can rapidly resolve an abnormal situation where a hydrogen supply line is determined to be abnormal by opening the hydrogen cut-off valve.

(b) Description of Related Art

In general, a fuel cell system includes a fuel cell stack generating electric energy, a fuel supply system supplying fuel (e.g., hydrogen, etc.) to the fuel cell stack, an air supply system supplying air (e.g., oxygen), which is an oxidant required for an electrochemical reaction in the fuel cell stack, a heat and water management system controlling an operation temperature of the fuel cell stack, and the like.

High-pressure compression hydrogen with a pressure of approximately 700 bars is stored in a hydrogen tank provided in the fuel supply system, that is, a hydrogen supply system and the compression hydrogen stored in the hydrogen tank is discharged to a high-pressure line according to on/off of a high-pressure controller mounted on an inlet of the hydrogen tank and thereafter, depressurized through a start valve and a hydrogen supply valve to be supplied to the fuel cell stack.

In this case, the fuel (hydrogen) is high-pressure gas, and accordingly, a storage tank is required in order to store and discharge the high-pressure gas as necessary. In particular, since a storage density of the gas is low in the storage tank, it is efficient to store the gas at high pressure. However, there may be a disadvantage that the gas is exposed to a risk of explosion due to high pressure. Particularly, since a mounting space of the storage tank is limited in an alternative fuel gas vehicle, securing safety while maintaining storage pressure at the high pressure is a core of the technology.

A regulator, valve components of hydrogen cut-off valves and hydrogen supply valves, and pipes through which the hydrogen may flow and various points for fitting the pipes may be formed between the storage tank (tank) and the fuel cell stack of the fuel cell system, and airtightness of the hydrogen which flows along the pipes is one of the most important performances related to safety of the hydrogen supply system and safety of the entire fuel cell system. Accordingly, the hydrogen cut-off valve may be adopted between the regulator and the hydrogen supply valve in a hydrogen supply line of the fuel cell system for the safety of the high-pressure hydrogen.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with prior art.

According to the fuel cell system in the related art, monitoring a pressure of an anode or a separate determination means and a separation determination method are required to determine whether the hydrogen cut-off valve which may be disposed on the hydrogen supply line is abnormally closed. However, the present disclosure provides a control method which determines whether a hydrogen cut-off valve is abnormally closed by directly measuring an opening degree of a hydrogen supply valve and the resulting hydrogen supply line pressure to rapidly determine an abnormal state of the hydrogen cut-off valve, and furthermore, can rapidly determine whether other parts and components between a storage tank storing hydrogen and the hydrogen supply valve are abnormal.

In one aspect, the present disclosure provides a method for controlling a hydrogen cut-off valve in driving a fuel cell vehicle mounted with a hydrogen supply line including a tank storing hydrogen, a hydrogen supply valve, and a hydrogen cut-off valve, which includes: a step (a) of measuring a duty applying to the hydrogen supply valve; and a step (b) of comparing the duty with a predetermined duty, in which when the duty is equal to or more than the predetermined duty, it is determined that the hydrogen supply line between the tank and the hydrogen supply valve is abnormal.

In a preferred embodiment, in step (b), when it is determined that the duty is equal to or more than the predetermined duty, the hydrogen cut-off valve may be opened.

In another preferred embodiment, after step (b), when the duty is equal to or less than the predetermined duty, it may be determined that the hydrogen supply line between the tank and the hydrogen supply valve is normal and the process may restart from step (a).

In still another preferred embodiment, the method may further include: after step (b), a step (c) of measuring the pressure of the hydrogen supply line and comparing the measured pressure with a predetermined pressure value when the duty is equal to or more than the predetermined duty; and a step (d) of opening the hydrogen cut-off valve when the hydrogen supply line pressure is equal to or higher than the predetermined pressure value.

In yet another preferred embodiment, when the duty of the hydrogen supply valve is equal to or more than the predetermined duty and the hydrogen supply line pressure is equal to or higher than the predetermined pressure value, it may be determined that the hydrogen cut-off valve on the hydrogen supply line is abnormal.

In a further preferred embodiment, after step (c), when the pressure of the hydrogen supply line is equal to or lower than the predetermined pressure value, it may be determined that one point of the hydrogen supply line between the tank and the hydrogen supply valve and at least one component of the regulator on the hydrogen supply line and the tank are abnormal and a warning lamp for announcing the abnormality to a user of the fuel cell vehicle may be turned on.

In another further preferred embodiment, the method may further include, after step (d), a step (e) in which the warning lamp of the fuel cell vehicle is turned on and the fuel cell vehicle is transitioned to an EV mode to shut down driving of the fuel cell system of the fuel cell vehicle when the number of occurrences that the hydrogen cut-off valve is opened for is measured and the measured number of occurrences is equal to or more than a predetermined number of occurrences.

In still another further preferred embodiment, the hydrogen cut-off valve may be a pilot type valve.

In yet another further preferred embodiment, in step (d), before the hydrogen cut-off valve is opened, the hydrogen supply valve may be closed for a predetermined time and thereafter, the hydrogen cut-off valve may be opened.

The present disclosure provides the following effects through the means for solving problems.

According to the present disclosure, an abnormal closed state of a hydrogen cut-off valve on a hydrogen supply line is promptly detected to open the hydrogen cut-off valve again before occurrence of damage to the entire fuel cell system due to the abnormal closed state. As a result, deterioration of a fuel cell stack due to lack of hydrogen supply and abrupt abnormal stop and transition to an EV mode of the fuel cell system during driving can be prevented in advance.

Current is consumed in order to maintain the opening of the hydrogen cut-off valve and since it is advantageous in improvement of the overall efficiency of the fuel cell system to maintain the consumption of the current at a minimum during normal running of the fuel cell system, it is possible to predict a fuel efficiency improvement effect of a vehicle equipped with the fuel cell system by minimizing the current consumed to open the hydrogen cut-off valve in the present disclosure.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
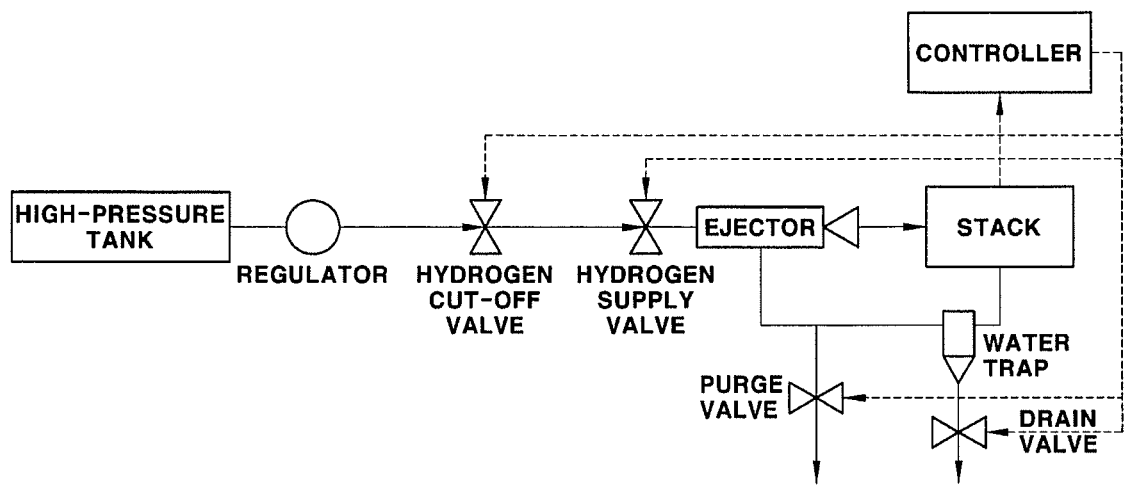
FIG. 1 is a diagram illustrating an embodiment of a connection relationship among components of a fuel cell system, in which a control method of the present disclosure can be implemented.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an embodiment of the present disclosure will be described in more detail with reference to the accompanying drawings. The embodiment of the present disclosure can be modified in various forms, and it should not be construed that the scope of the present disclosure is limited to embodiments described below. The embodiments are provided to more completely describe the present disclosure to those skilled in the art.

Terms including "part', "unit", "module", and the like disclosed in the specification mean a unit that processes at least one function or operation and this may be implemented by hardware or software or a combination of hardware and software.

A fuel cell system mounted on a vehicle may be generally configured to include a fuel cell stack generating electric energy, a fuel supply device supplying fuel (hydrogen) to the fuel cell stack, an air supply device supplying oxygen in air, which is an oxidant required for an electrochemical reaction to the fuel cell stack, a cooling system removing reaction heat of the fuel cell stack to the outside of the system and controlling an operation temperature of the fuel cell stack, and a controller capable of controlling opening/closing a plurality of valves provided in the fuel cell system.

FIG. 1 is a diagram illustrating components and a connection relationship among the components of a fuel cell system according to an embodiment of the present disclosure. Referring to FIG. 1, a high-pressure tank containing hydrogen may exist as a fuel storage container in a hydrogen fuel supply system of the present disclosure. The hydrogen may be preferably contained and used as fuel in the high-pressure tank and high-pressure hydrogen gas with a pressure of approximately 700 bars may be stored in the high-pressure tank.

According to FIG. 1, the controller of the fuel cell system according to the present disclosure is electrically connected to the hydrogen supply valve, the hydrogen shut-off valve, a purge valve, and a drain valve to control opening and/or closing of each valve by a signal and communication. Furthermore, the controller is connected even with the fuel cell stack to receive state information of the fuel cell stack, such as voltage, current, and a temperature of the fuel cell stack.

A regulator as a component apparent to those skilled in a field of the fuel cell system may depressurize the high-pressure hydrogen contained in the high-pressure tank and supply the depressurized hydrogen to a rear end of the regulator. Moreover, since an ejector, the stack, the purge valve, a water trap, and the drain valve are also components apparent to those skilled in the art of the fuel cell system and are components which are generally used, a detailed description thereof will be hereinafter omitted.

Turning to FIG. 1, a hydrogen supply line is illustrated between the high-pressure tank and the fuel cell stack and the hydrogen may flow from the high-pressure tank to the fuel cell stack along the hydrogen supply line. The regulator, the hydrogen cut-off valve, and the hydrogen supply valve may be positioned on the hydrogen supply line. In a layout order of the components of the hydrogen supply line according to the embodiment of the present disclosure, the regulator, the hydrogen cut-off valve, and the hydrogen supply valve may be disposed on the hydrogen supply line in order according to an order in which the components are disposed to be closer to the high-pressure tank. That is, the hydrogen cut-off valve may be provided at one point of the hydrogen supply line between the regulator and the hydrogen supply valve.

Meanwhile, the hydrogen supply valve may be a normally-closed (NC) type valve. The hydrogen supply valve may control the amount of hydrogen supplied to the fuel cell stack together with an in-tank regulator formed in the high-pressure tank or a regulator which may be provided on a flow path which extends from the high-pressure tank. The hydrogen supply valve may be preferably configured by a solenoid type valve which may be driven by an electromagnet. The hydrogen supply valve may principally perform a feed-back control to control the hydrogen supply amount by comparing the pressure of an anode with the pressure of the hydrogen supply line. In detail, the controller receives the pressure of the anode, which is measured by a pressure sensor of the anode and the controller may increase a duty applying to the hydrogen supply valve when the measured pressure of the anode is lower than a target pressure of the anode.

Figure 2:
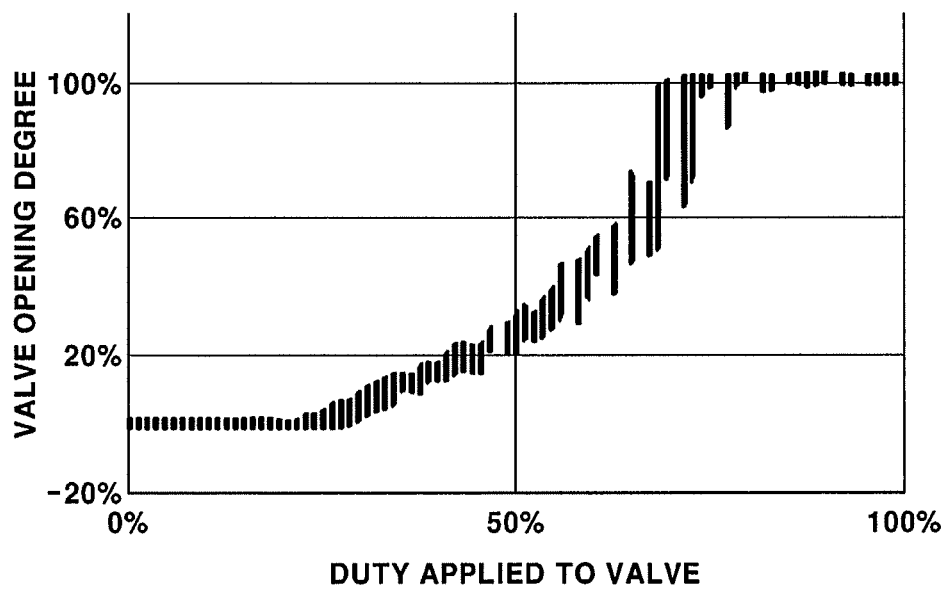
FIG. 2 is a diagram illustrating an opening degree of a valve according to a duty applying to the valve in a hydrogen supply valve of the present disclosure.

FIG. 2 is a diagram illustrating an opening degree of a hydrogen supply valve according to a duty applying to the hydrogen supply valve. Referring to FIG. 2, it can be seen that as the duty applying to the hydrogen supply valve increases, the opening degree of the hydrogen supply valve increases in proportion to the duty. If the hydrogen supply valve is a valve driven by electromagnetism, the duty applying to the hydrogen supply valve and the opening of the valve may not be directly proportional to each other due to a hysteresis phenomenon. However, both sides may have a linear relationship. Preferably, the valve that may be driven by an electromagnet may be opened at a valve opening duty of approximately 20 to 40% in order to absorb a deviation between an opening/closing deviation for each valve and a pressure discharged from the regulator. Further, when the valve opening duty is approximately 70 to 90%, the valve may be opened to the maximum. An opening start duty and a maximum opening duty may vary according to specific design conditions and an environment and in the present disclosure a duty at the time when the valve is opened to the maximum may be referred to as a 'maximum opening duty'.

The reason why a duty at the start time of opening of the valve is not 0%, and the duty at which the valve is opened to the maximum is not 100% is that the valve cannot but be affected by an applied pressure and the temperature of a coil due to a proportional control valve characteristic. For example, as a higher pressure is applied to the valve, the valve opening may start even a lower duty and the higher the temperature of the coil is, the resistance of the coil increases, and as a result, the duty for the maximum opening may approach 100%. The amount of hydrogen supplied from the hydrogen supply valve to the fuel cell stack may be determined by the controller and specifically, the controller determines the amount of the hydrogen supplied to the fuel cell stack by considering a hydrogen consumption amount under a maximum output condition of the fuel cell system, the amount of hydrogen discharged to the outside through a purge valve, an appropriate level of offset (margin).

In summary, when the controller increases the duty of the current applied to the hydrogen supply valve, the opening degree of the hydrogen supply valve increases, the amount of hydrogen supplied from the high-pressure tank to the fuel cell stack may increase. On the contrary, when the controller decreases the duty of the current applied to the hydrogen supply valve, the opening degree of the hydrogen supply valve decreases and the amount of hydrogen supplied from the high-pressure tank to the fuel cell stack may decrease. That is, the amount of hydrogen supplied to the fuel cell stack may be determined according to the opening degree of the hydrogen supply valve and the amount of energy which may be generated by driving the fuel cell stack may also be influenced. Furthermore, a meaning that the duty of the hydrogen supply valve is the maximum open duty or 100% may indicate that the hydrogen supply valve is fully open and the amount of hydrogen supplied from the hydrogen supply line to the fuel cell stack is thus the maximum value.

Generally, it is not common that the duty of the hydrogen supply valve becomes the maximum opening duty. A meaning that the duty of the hydrogen supply valve is the maximum opening duty may indicate a state in which the pressure of the hydrogen supply line is lowered. Such a situation may be specifically a situation in which the hydrogen consumption amount is extremely large by purging the hydrogen to the outside by opening the purge valve while an output of the fuel cell system is the maximum. Further, such a situation may be a situation in which since the hydrogen supplied from the high-pressure tank is abnormal, the pressure of the hydrogen supply line is not sufficiently high or a situation in which since the hydrogen cut-off valve is abnormally closed, the hydrogen is not normally supplied to a front end of the hydrogen supply valve. All of the cases are cases which may not be regarded as a state in which the fuel cell system is normally driven, and therefore, the case where the duty of the hydrogen supply valve becomes the maximum opening duty may be appreciated as a case where the fuel cell system is abnormally driven.

The hydrogen cut-off valve may be disposed between the regulator and the hydrogen supply valve on the hydrogen supply line as illustrated in FIG. 1. The hydrogen cut-off valve may be provided to prevent leakage of the hydrogen in the high-pressure tank and on the hydrogen supply line extended from the high-pressure tank in an abnormal case such as an incident situation, an abnormal situation, an accident occurrence situation, or the like of a vehicle mounted with the fuel cell system or in the case where the vehicle is parked.

There is no limit in the type of the hydrogen cut-off valve, but the hydrogen cut-off valve needs to have a structure to endure the high pressure on the hydrogen supply line. As an embodiment, the hydrogen cut-off valve may be configured by the normally closed (NC) valve or may be a solenoid type valve driven by the electromagnet, or the like. Preferably, the hydrogen cut-off valve may be a pilot type valve driven by a pilot therein.

The current needs to be applied to open the hydrogen cut-off valve and maintain the opened state. Specifically, the highest current (peak current) is consumed at the time when the hydrogen cut-off valve is opened from the closed state and thereafter, a state in which holding current lower than the peak current is applied to the hydrogen cut-off valve may be maintained. In this case, according to a driving situation of the vehicle, for example, in a situation such as crossing of a speed bump, a bumping shock, or off-road driving, external force is applied to the hydrogen cut-off valve to unwillingly or manually close the hydrogen cut-off valve. As the hydrogen cut-off valve is abruptly closed, the hydrogen supplied to the fuel cell stack may be abruptly cut off. In such a situation, non-linear braking of the vehicle and unpleasant ride comfort are caused and furthermore, since safety of vehicle driving may be threatened in a high-speed driving situation, it is very important to maintain the opened state of the hydrogen cut-off valve by applying high holding current to the hydrogen cut-off valve.

Accordingly, the present disclosure intends to propose a method that may, when the hydrogen cut-off valve is closed due to an influence of external shock, or the like, rapidly sense and determine the closing of the hydrogen cut-off valve and perform a control to immediately emergently open the hydrogen cut-off valve. Hereinafter, the method that determines whether the hydrogen supply line according to the present disclosure and the hydrogen cut-off valve of the hydrogen supply line are abnormal and controls the hydrogen supply line and the hydrogen cut-off valve will be described in detail with reference to FIGS. 3 to 5.

Figure 3:
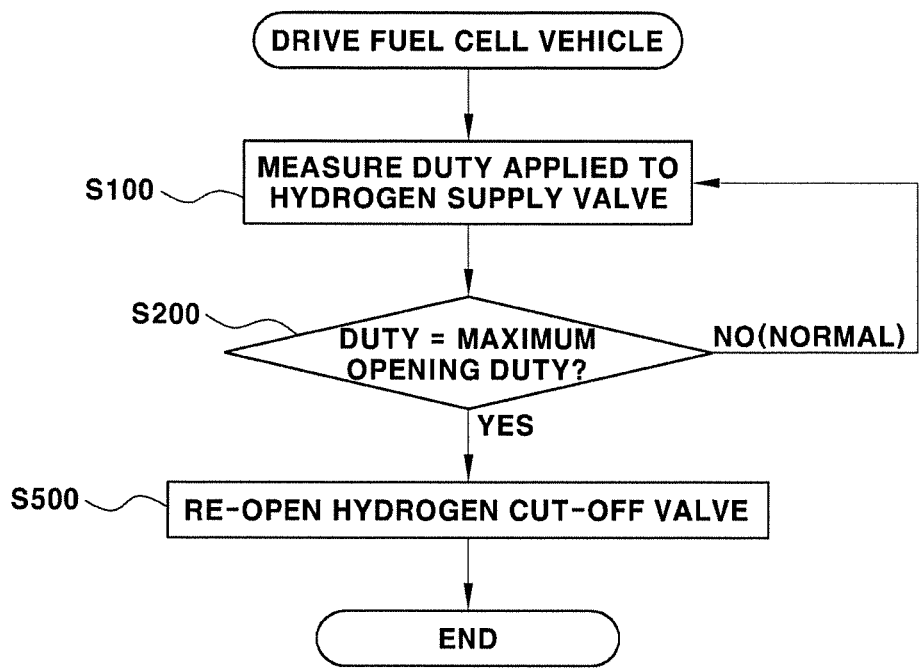
FIG. 3 is a flowchart illustrating a flow of logic for determining whether a hydrogen supply line is abnormal and re-opening a hydrogen cut-off valve as an embodiment of the present disclosure.

FIG. 3 is a flowchart illustrating a method for controlling a hydrogen cut-off valve according to an embodiment of the present disclosure. In the present disclosure, the method may include a step (S100) of measuring a duty applying to a hydrogen supply valve during driving of a fuel cell vehicle, that is, when a fuel cell stack inside a fuel cell system generates power to produce electric power. Preferably, since the hydrogen supply valve may be controlled by a controller, the controller may measure and observe the duty applying to the hydrogen supply valve. The method may include a step (S200) of comparing the measured duty with a predetermined duty. The predetermined duty may be set to a duty to open the hydrogen supply valve to the maximum or larger value. That is, the predetermined duty may have a value between the duty to open the hydrogen supply valve to the maximum and 100%.

A measured duty value of the hydrogen supply valve that is equal to or larger than the predetermined duty may indicate a state in which the hydrogen supply valve is opened to the maximum or a state in which the hydrogen supply valve is opened to be close to the maximum. That is, the state means a state in which maximum hydrogen which may be supplied on the hydrogen supply line between a rear end of the hydrogen cut-off valve and the fuel cell stack is supplied to the fuel cell stack.

However, the case where the duty of the hydrogen supply valve becomes the maximum opening duty as described above is not general, and further, the case may be a situation which does not frequently occur. Such a situation may be specifically a situation in which the hydrogen cut-off valve is abnormally closed, a component of the regulator is abnormal, leak occurs at one point of the hydrogen supply line, or other components of the hydrogen supply line are abnormal. However, in the vehicle mounted with the fuel cell system, since an occurrence frequency of the abnormal situation except for the case where the hydrogen cut-off valve is abnormally closed is remarkably low, a normal recovery method that preferentially opens the hydrogen cut-off valve may be adopted in the present disclosure. That is, in an embodiment of the present disclosure, it is determined that the hydrogen supply valve is opened to the maximum because the hydrogen cut-off valve is abnormally closed to promptly open the hydrogen cut-off valve. The controller may repeatedly and periodically measure the duty value of the hydrogen supply valve after opening the hydrogen cut-off valve.

When the measured duty value of the hydrogen supply valve is equal to or less than the predetermined duty value, there is no ground to determine that the hydrogen supply line and the hydrogen cut-off valve are abnormal and the controller may repeatedly and periodically measure the duty value of the hydrogen supply valve.

Figure 4:
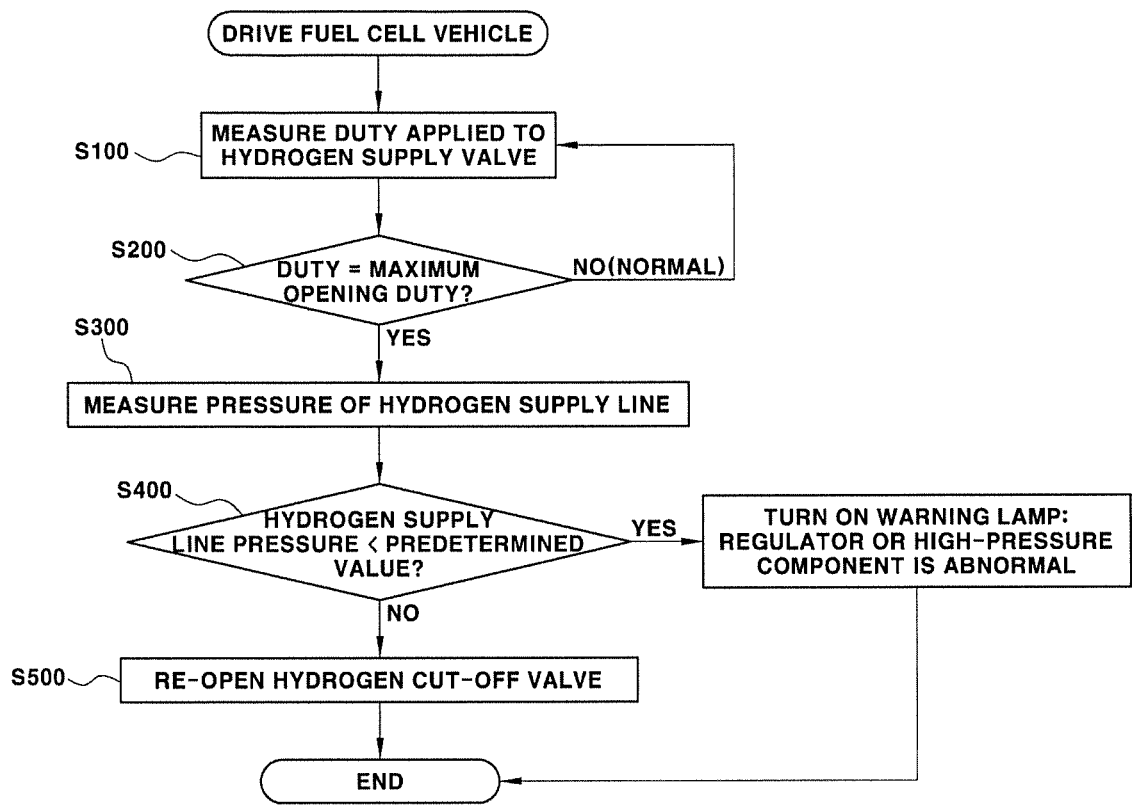
FIG. 4 is a flowchart illustrating a flow of logic for determining whether a hydrogen supply line is abnormal by a duty and a hydrogen supply line pressure and re-opening a hydrogen cut-off valve as another embodiment of the present disclosure.

FIG. 4 is a flowchart illustrating a flow of a method for determining whether a hydrogen supply line and a hydrogen cut-off valve are abnormal and controlling the hydrogen cut-off valve according to another embodiment of the present disclosure. Referring to FIG. 4, the duty of the hydrogen supply valve is measured to determine whether the duty is the predetermined duty value or more or the maximum opening duty similarly to FIG. 3. The embodiment of FIG. 4 is different from FIG. 3 in that the method further includes a step of measuring the pressure of the hydrogen supply line when the duty is the predetermined value or more in the embodiment by FIG. 4. According to the embodiment, the method may include a step (S300) of measuring the pressure of the hydrogen supply line at one point between the tank and the hydrogen cut-off valve on the hydrogen supply line.

The method may include a step (S400) of comparing whether the pressure of the hydrogen supply line between the tank and the hydrogen cut-off valve is larger or smaller than a predetermined pressure value. The predetermined pressure value may mean a value set by considering an offset in an average and normal pressure range shown at each point of the hydrogen supply line when the hydrogen supply line in which the hydrogen supply valve, the hydrogen cut-off valve, and the fuel cell stack are connected from the tank through the regulator is normally driven. When the hydrogen cut-off valve is abnormal and thus closed, the hydrogen may not flow to the rear end of the hydrogen cut-off valve even though the hydrogen supply valve is opened to the maximum.

In the embodiment of FIG. 4, the reason for measuring the pressure of the hydrogen supply line between the tank and the hydrogen cut-off valve and comparing the pressure of the hydrogen supply line with the predetermined pressure is that the pressure of the hydrogen supply line between the tank and the hydrogen cut-off valve cannot but be high regardless of opening or not of the hydrogen supply valve by considering an array order of the tank, the hydrogen supply valve, and the hydrogen cut-off valve (see FIG. 1). Therefore, it is definite that such a case is a phenomenon which occurs as the hydrogen cut-off valve is closed when the pressure of the hydrogen supply line, which is measured between the tank and the hydrogen cut-off valve, is equal to or higher than the predetermined pressure, and as a result, the method may include a step (S500) of opening the hydrogen cut-off valve in the controller. Accordingly, an abnormal situation depending on abnormal closing of the hydrogen cut-off valve may be resolved. Furthermore, similarly to FIG. 3, the controller may repeatedly and periodically measure the duty value of the hydrogen supply valve.

However, in the case where the hydrogen supply line pressure between the tank and the hydrogen cut-off valve is equal to or lower than the predetermined pressure in the state where the duty of the hydrogen supply valve is the maximum opening duty, the case may mean the state where the hydrogen cut-off valve is opened. Consequently, it may be determined that the component (e.g., the regulator) other than the hydrogen cut-off valve is in a failure state, such as the case where the hydrogen leaks at one point of the hydrogen supply line, or the like. Therefore, a warning lamp for eliciting a rapid follow-up action of a user and notifying that a risk factor exists in stability of the fuel cell vehicle to the user may be turned on.

Figure 5:
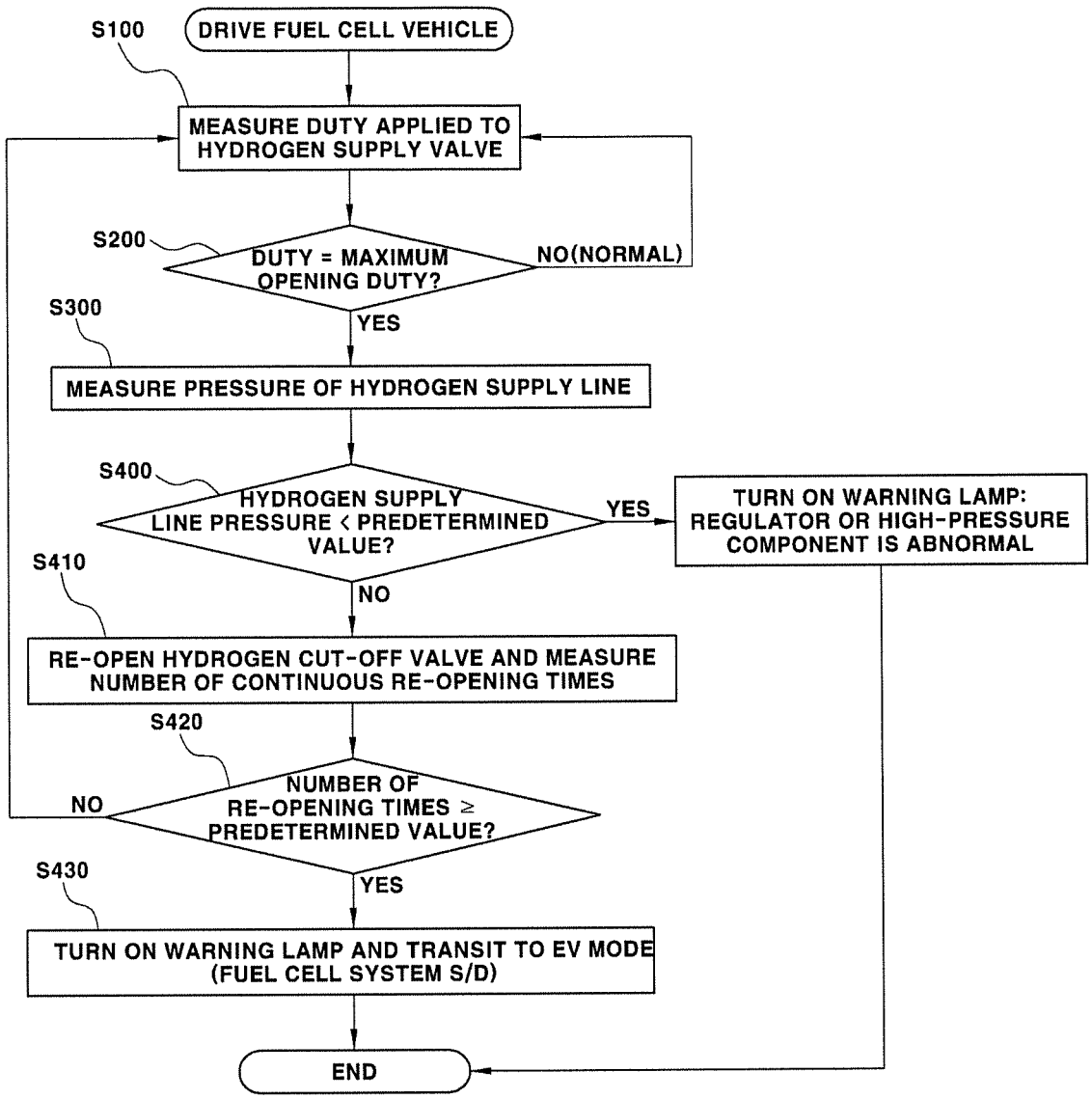
FIG. 5 is a flowchart illustrating a flow of logic in which a fuel cell system is shut down and transitioned to an EV mode by determining the number of occurrences that the hydrogen cut-off valve is opened for, as yet another embodiment of the present disclosure.

FIG. 5 is a flowchart illustrating a method for controlling a hydrogen cut-off valve according to yet another embodiment of the present disclosure and the process of FIG. 5 may be the same as the process illustrated in FIG. 4 up to the step of measuring the duty of the hydrogen supply valve and comparing the measured duty with the predetermined duty and measuring the pressure of the hydrogen supply line between the tank and the hydrogen cut-off valve and comparing the measured pressure of the hydrogen supply line with the predetermined pressure.

However, according to the embodiment of FIG. 5, the method may include a step (S410) of measuring, recording, and storing the number of accumulation times to open the hydrogen cut-off valve in the controller. As a result, the method may include a step (S420) of determining whether the number of opening times is equal to or more than a predetermined number of opening times. Moreover, the method may include a step (S430) to stop and shut down the fuel cell system and transit the fuel cell vehicle to an EV mode. The electronic vehicle (EV) mode in the present disclosure may mean a state in which the vehicle is driven by driving a motor only with a remaining amount of a charged battery entirely without consuming the fuel.

A case where the hydrogen supply valve maintains the maximum opening duty state and the pressure of the hydrogen supply line between the tank and the hydrogen cut-off valve is not reduced in spite of delivering an opening command of the hydrogen cut-off valve at a predetermined number of opening times or more may mean that the hydrogen cut-off valve still maintains the closed state. Accordingly, the case may be a situation in which a communication system between the controller and the hydrogen cut-off valve is abnormal or physical and structural problems of the hydrogen cut-off valve occur. Therefore, a warning lamp for eliciting a rapid follow-up action of a user and notifying that a risk factor exists in stability of the fuel cell vehicle to the user may be turned on.

In summary, a core spirit of the present disclosure is characterized in that the opening degree of the hydrogen supply valve is determined through the duty and the case where the hydrogen supply valve is opened to the maximum is determined as an abnormal state and in particular, in the case where the pressure of the hydrogen supply line between the tank and the hydrogen cut-off valve is equal to or higher than the predetermined pressure, the case is determined as the abnormal state depending on abnormal closing of the hydrogen cut-off valve, and as a result, the controller opens the hydrogen cut-off valve. Accordingly, in the present disclosure, the state in which the hydrogen supply valve is opened to the maximum is not general and in most cases, it should be noted that a focus is placed on a fact that the maximum opened state of the hydrogen supply valve is the abnormal state caused as the hydrogen cut-off valve is closed due to external factors.

Embodiments of the present disclosure have been explained and described, but it will be appreciated by those skilled in the art that the present disclosure may be modified and changed in various ways without departing from the spirit of the present disclosure described in the claims by the addition, change, deletion or addition of constituent elements, and that the modifications and changes are included in the claims of the present disclosure.

In describing the embodiment of the present disclosure, detailed description of known function or constitutions will be omitted if they make the gist of the present disclosure unnecessarily be obscure. In addition, the used terms as terms which are defined in consideration of functions in the embodiment of the present disclosure may vary depending on the intention or usual practice of a user or an operator. Accordingly, the terms need to be defined base on contents throughout this specification. Accordingly, the detailed description of the invention does not intend to limit the present invention to the disclosed embodiment and it should be interpreted that the appended claims also include other embodiments.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling a hydrogen cut-off valve in driving a fuel cell vehicle mounted with a hydrogen supply line including a high-pressure tank storing hydrogen of high-pressure, a hydrogen supply valve, and a hydrogen cut-off valve disposed between the high-pressure tank and the hydrogen supply valve on the hydrogen supply line, the method comprising:

a step (a) of measuring a duty of electric current applying to the hydrogen supply valve; and a step (b) of comparing the duty with a predetermined duty, wherein when the duty of electric current applying to the hydrogen supply valve is equal to or more than the predetermined duty, it is determined that the hydrogen cut-off valve disposed between the high-pressure tank and the hydrogen supply valve is abnormal, and then the hydrogen cut-off valve is opened.

2. The method of claim 1, wherein after step (b), when the duty is equal to or less than the predetermined duty, it is determined that the hydrogen supply line between the high-pressure tank and the hydrogen supply valve is normal and the method for controlling a hydrogen cut-off valve restarts from step (a).

3. The method of claim 1, further comprising:
   after step (b),
   a step (c) of measuring pressure of the hydrogen supply line and comparing the measured pressure with a predetermined pressure value when the duty is equal to or more than the predetermined duty.

4. The method of claim 3, wherein when the hydrogen supply line pressure is equal to or higher than the predetermined pressure value, it is determined that the hydrogen cut-off valve on the hydrogen supply line is abnormal.

5. The method of claim 3, wherein after step (c), when the pressure of the hydrogen supply line is equal to or lower than the predetermined pressure value, it is determined that one point of the hydrogen supply line between the high-pressure tank and the hydrogen supply valve and at least one component of a regulator on the hydrogen supply line and the high-pressure tank are abnormal, and in response a warning lamp for announcing the abnormality to a user of the fuel cell vehicle is turned on.

6. The method of claim 3, further comprising:
   after step (d),
   a step (e) in which the warning lamp of the fuel cell vehicle is turned on and the fuel cell vehicle is transitioned to an EV mode to shut down driving of a fuel cell system of the fuel cell vehicle, when a number of occurrences that the hydrogen cut-off valve is continuously opened for is measured and the measured number of occurrences is equal to or more than a predetermined number of occurrences.

7. The method of claim 3, wherein the hydrogen cut-off valve is a pilot valve.

8. The method of claim 7, wherein in step (d), before the hydrogen cut-off valve is opened, the hydrogen supply valve is closed for a predetermined time and thereafter, the hydrogen cut-off valve is opened.

* * * * *